(12) United States Patent
Anderson et al.

(10) Patent No.: US 7,618,533 B2
(45) Date of Patent: Nov. 17, 2009

(54) FILTER SYSTEM FOR AN AUTOMOBILE ENGINE

(76) Inventors: Jason H. Anderson, 902 E. McConnell Ave., Parma, ID (US) 83660; Cristy Anderson, 902 E. McConnell Ave., Parma, ID (US) 83660

(*) Notice: Subject to any disclaimer, the term of this patent is extended or adjusted under 35 U.S.C. 154(b) by 403 days.

(21) Appl. No.: 11/545,653

(22) Filed: Oct. 9, 2006

(65) Prior Publication Data
US 2009/0032452 A9 Feb. 5, 2009

Related U.S. Application Data

(63) Continuation of application No. PCT/US03/35192, filed on Nov. 6, 2003.

(51) Int. Cl.
*B01D 35/02* (2006.01)
*B01D 27/00* (2006.01)

(52) U.S. Cl. .............. 210/167.01; 210/95; 210/181; 210/232; 210/416.1; 210/437

(58) Field of Classification Search ............ 210/167.01, 210/171, 175, 181, 232, 416.1, 435, 437, 210/446, 95
See application file for complete search history.

(56) References Cited

U.S. PATENT DOCUMENTS

| | | | |
|---|---|---|---|
| 2,011,031 A * | 8/1935 | Birch | 210/186 |
| 3,540,528 A | 11/1970 | Moon | |
| 4,343,353 A | 8/1982 | Tsopelas | |
| 4,379,052 A | 4/1983 | Stearns | |
| 4,444,247 A | 4/1984 | Franck et al. | |
| 4,759,842 A | 7/1988 | Frees et al. | |
| 4,966,550 A | 10/1990 | Privat | |
| 5,160,427 A * | 11/1992 | Barnette | 210/95 |
| 5,318,700 A | 6/1994 | Dixon et al. | |
| 6,267,881 B1 * | 7/2001 | Covington | 210/167.32 |

FOREIGN PATENT DOCUMENTS

JP 07-034869 A * 2/1995

* cited by examiner

*Primary Examiner*—Fred Prince

(57) ABSTRACT

A filter system for use in an automobile engine includes a filter unit fluidically interposed between a fluid pump of the engine and a heater core of the engine. The filter unit includes an inner core removably mounted in an outer case. The inner core includes a fluid permeable wall which filters fluid as the fluid passes through the filter unit.

10 Claims, 2 Drawing Sheets

FILTER SYSTEM FOR AN AUTOMOBILE ENGINE

RELATED APPLICATION

This application is a continuation of PCT/US2003/035192, filed Nov. 6, 2003, which is hereby incorporated by reference.

TECHNICAL FIELD OF THE INVENTION

The present invention relates to the general art of liquid purification, and to the particular field of filters used in automobiles.

BACKGROUND OF THE INVENTION

The inventor has discovered that some expensive damage to an automobile engine can be traced to contaminants in the cooling fluid being circulated through the engine. These contaminants can be small dirt particles, ions, or the like and can migrate into the coolant fluid from outside the engine or can be contained in the coolant when it is initially placed in the engine. At any rate, such contaminants are not desirable. Therefore, there is a need for a system for filtering out contaminants in liquid used in an engine cooling system.

While the art of liquid purification contains many examples of filters, the inventor is not aware of any filter system that can be inserted between a fluid pump of an automobile engine and the heater core of that automobile engine. Therefore, there is a need for a system for filtering out contaminants in liquid used in an engine cooling system and which can be inserted between the fluid pump of the automobile engine and the heater core of that automobile engine.

Any filter system must be cleaned and monitored. Therefore, it is not sufficient to merely place a filter in a system, that filter must be monitored. Without proper monitoring, the filter may become clogged and become counter-productive. Furthermore, once it is determined that a filter must be cleaned, it is most efficient if that filter can be easily and efficiently cleaned without a great deal of trouble. Therefore, there is a need for a system for filtering out contaminants in liquid used in an engine cooling system and which can be monitored and efficiently maintained.

Many automobile owners may want to install a filter system into the engine of their automobile. However, if it is difficult to install such a system, it may be cost-prohibitive to do so, and the automobile engine will not receive the benefits associated with such a filter system. Therefore, there is a need for a system for filtering out contaminants in liquid used in an automobile engine cooling system and which can be easily and efficiently retrofit into an existing engine.

OBJECTS OF THE INVENTION

It is a main object of the present invention is to provide a system for filtering out contaminants in liquid used in an engine cooling system.

It is another object of the present invention to provide a system for filtering out contaminants in liquid used in an engine cooling system and which can be inserted between the fluid pump of the automobile engine and the heater core of that automobile engine.

It is another object of the present invention to provide a system for filtering out contaminants in liquid used in an engine cooling system and which can be monitored and efficiently maintained.

It is another object of the present invention to provide a system for filtering out contaminants in liquid used in an automobile engine cooling system and which can be easily and efficiently retrofit into an existing engine.

SUMMARY OF THE INVENTION

These, and other, objects are achieved by a system for filtering coolant used in an engine of an automobile which comprises an engine liquid coolant; a liquid pump fluidically connected to the liquid coolant for moving the liquid coolant through an automobile engine to cool that automobile engine; an engine heater core which is cooled by the liquid coolant; a coolant filter unit which is fluidically interposed between the liquid pump and the engine heater core and through which the liquid coolant flows as the liquid coolant flows from the liquid pump to said engine heater core, the coolant filter unit including an outer case, the outer case including a fluid outlet, an inner core accommodated in the outer case, the inner core including a fluid inlet, the inner core including a perforated tubular wall with the fluid inlet being fluidically connected to the fluid outlet via the inner core and via the perforated tubular wall, a releasable connection between the outer case and the inner core, and positioning elements on the inner core; a fluid connection between the liquid pump and the fluid inlet of the inner core; and a fluid connection between the fluid outlet of the outer case and the engine heater core.

The filter system of the present invention is located to efficiently and effectively clean coolant flowing from a water pump to a heater core of an automobile engine. The filter system is easily placed into the engine and once in place is easily monitored and maintained. The filter system is easily removed for cleaning and then can be easily and quickly replaced. Furthermore, the system of the present invention can be easily and efficiently retrofit into an existing automobile engine.

BRIEF DESCRIPTION OF THE DRAWING FIGURES

DETAILED DESCRIPTION OF THE PREFERRED EMBODIMENT OF THE INVENTION

Figure 1:
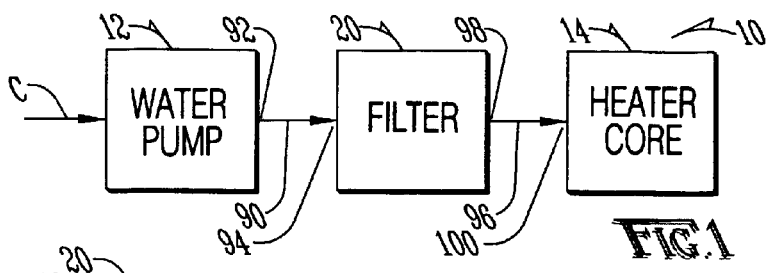
FIG. 1 is a block diagram showing the filter system embodying the present invention.

Other objects, features and advantages of the invention will become apparent from a consideration of the following detailed description and the accompanying drawings.

Referring to the figures, it can be understood that the present invention is embodied in a system 10 for filtering coolant used in an engine of an automobile. System 10 comprises an engine liquid coolant C, a liquid pump 12 fluidically connected to the liquid coolant for moving the liquid coolant through an automobile engine to cool that automobile engine and an engine heater core 14 which is cooled by the liquid coolant.

A coolant filter unit 20 is fluidically interposed between the liquid pump 12 and the engine heater core 14 and through which the liquid coolant flows as the liquid coolant flows from the liquid pump 12 to the engine heater core 14. Coolant filter unit 20 includes an outer case 22 which has an inlet end 24, an outlet end 26 and a tubular wall 28 which extends between the inlet end 24 and the outlet end 26. The tubular wall 28 has an outer surface 30 and an inner surface 32. An internal bore 34 is defined by the inner surface 32 of the tubular wall 28 and the internal bore 34 extends between the inlet end 24 of the outer case 22 and the outlet end 26 of the outer case 22. An external screw thread 36 is located on the outer surface 30 of the outer case 22 adjacent to the inlet end 24, and an outlet hose connection 38 is located on the outlet end 26 of the outer case 22. The outlet hose connection 38 is fluidically connected to the internal bore 34. A hose engaging element 40 is located on the outlet hose connection 38, and an O-ring seal 42 can be included on the filter unit 20.

An inner core unit 50 is releasably connected to the outer case 2 when the coolant filter unit 22 is in a use condition such as shown in FIG. 1. The inner core unit 50 includes an inlet end 52 which is connected to the inlet end 24 of the outer case 22 when the filter unit 20 is in the use condition. A second end 54 is located adjacent to the outlet end 26 of the outer case 22 when the filter unit is in the use condition.

A cap 56 is on the inlet end 52 of the inner core unit 50. The cap includes a screw thread 58 located to threadably engage the external screw thread 36 on the outer surface 30 of the outer case 22 when the inner core 50 is in the use condition. A tubular wall 60 is mounted on the cap 56 and is located in the internal bore 34 of the outer case 22 when the filter unit 20 is in the use condition. The tubular wall 60 has a first end 62 fixed to the cap 56, a second end 64 which is located in the internal bore 34 of the outer case 22 when the filter unit 20 is in the use condition. A positioning element, such as tab 66, is mounted on the inner core unit 50. In one form of the unit 50, the tabs are spaced apart at 900 intervals, and engage like elements on the outer case 22 to ensure proper positioning of the inner core 50 in the outer case 22.

Figure 3:
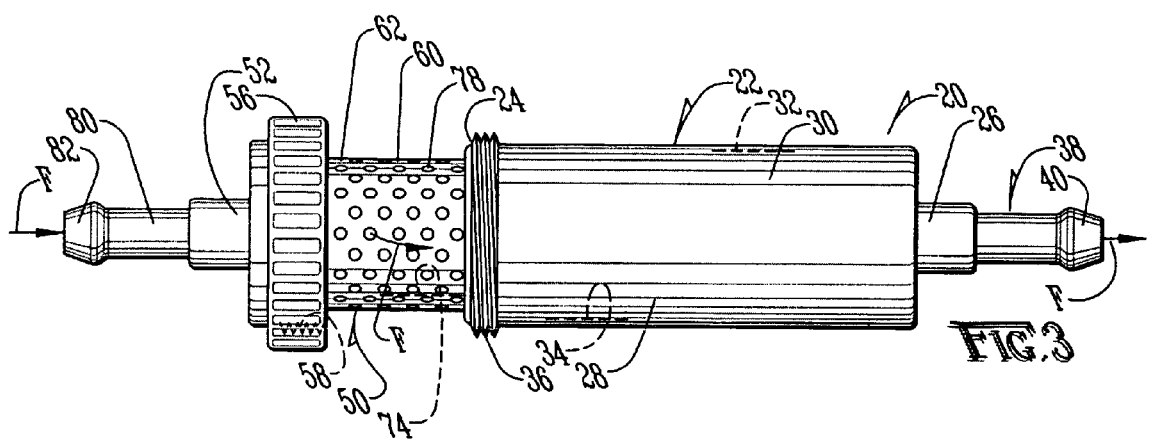
FIG. 3 is a side elevational view of a filter unit with an inner core partially displaced from an outer case of the unit.
Figure 4:
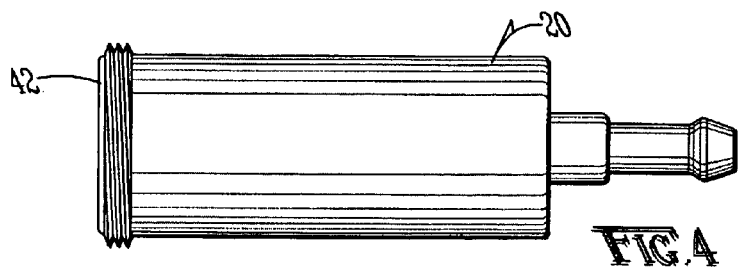
FIG. 4 is a side elevational view of the outer case of one form of the filter unit of the present invention.
Figure 5:
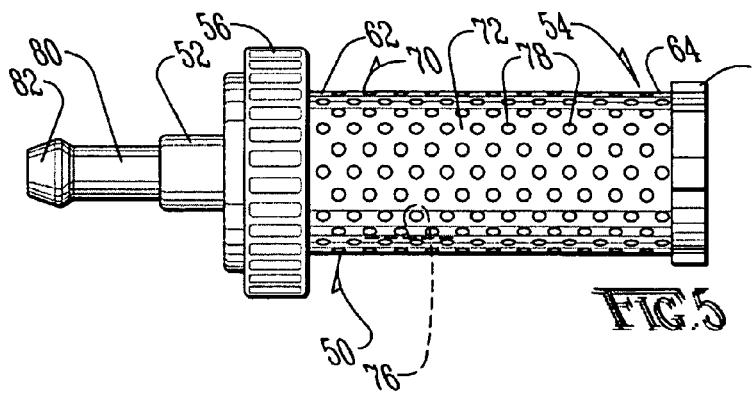
FIG. 5 is a side elevational view of the inner core of one form of the filter unit of the present invention.
Figure 6:
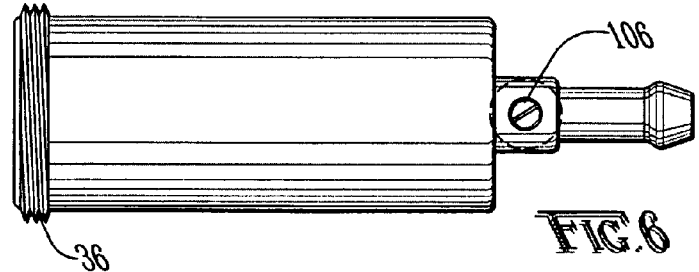
FIG. 6 is a side elevational view of the outer case of the form of the filter unit shown in FIG. 1.
Figure 7:
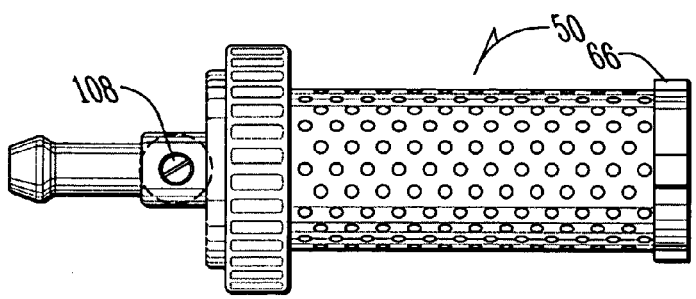
FIG. 7 is a side elevational view of the inner core of one form of the filter unit shown in FIG. 1.
Figure 8:
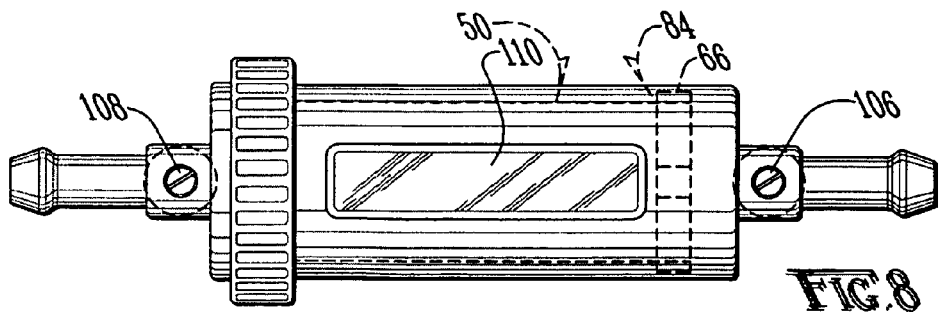
FIG. 8 is a side elevational view of another form of the filter unit embodying the present invention.

A perforated tubular wall 70 is formed of stainless steel and is sized and configured to be accommodated in the internal bore 34 defined by the inner surface 32 of the outer case 22 when the filter unit 20 is in the use condition. The perforated wall has an outer surface 72, which is in fluid communication with the internal bore 34 of the outer case 22 when the filter unit is in the use condition, an internal surface 74. An internal bore 76 is defined by the inner surface 74 of the tubular wall 60 and extends between the first end 62 of the tubular wall 60 and the second end 64 of the tubular wall 60. The tubular 60 wall further includes a multiplicity of fluid passage holes, such as hole 78, defined therethrough which fluidically connect the internal bore 76 of the tubular wall 60 to the outer surface 72 of the tubular wall 70 whereby the internal bore 76 of the tubular wall 70 is in fluid communication with the internal bore 34 of the outer case 22 when the filter unit 20 is in the use condition. The internal bore 76 of the tubular wall 60 is fluidically connected to the inlet end 52 of the inner core 50 whereby the inlet end 24 of the outer case 22 is fluidically connected to the outlet end 26 of the outer case 22 via the filter unit 20 as indicated by flow lines F in FIG. 3.

An inlet hose connection 80 is located on the cap 56 and is fluidically connected to the internal bore 76 of the tubular wall 60, and a hose engaging element 82 is located on the inlet hose connection 80. Positioning tab system 84 includes tab 66 and is located on the inner core 50 and on the outer case 22. An inlet hose 90 has an inlet end 92 fluidically connected to the liquid pump 12 and an outlet end 94 fluidically connected to the inlet hose connection 80 of the inner core 50. An outlet hose 96 has an inlet end 98 fluidically connected to the outlet hose connection 38 on the outlet end 26 of the outer case 22 and an outlet end 100 fluidically connected to the engine heater core 14.

Figure 2:
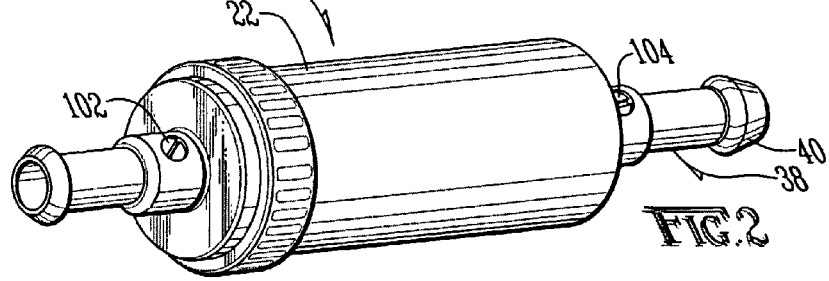
FIG. 2 is a perspective view of an assembled filter unit included in the filter system of the present invention.

Further forms of the filter unit are shown in FIGS. 2, and 6-8. As shown in FIG. 2, a set screw 102 can be located in the inlet hose connection 80 and a set screw 104 can be located on the outlet hose connection 38. The set screws can be associated with ball valves, such as ball valve 106 shown in FIG. 6 and ball valve 108 shown in FIG. 7. A viewing screen 110 can also be included if suitable whereby filter unit 20 can be viewed.

It is understood that while certain forms of the present invention have been illustrated and described herein, it is not to be limited to the specific forms or arrangements of parts described and shown.

What is claimed is:

1. A system for filtering coolant used in an engine of an automobile comprising:
   A) an engine liquid coolant;
   B) a liquid pump fluidically connected to said liquid coolant for moving said liquid coolant through an automobile engine to cool that automobile engine;
   C) an engine heater core which is cooled by said liquid coolant;
   D) a coolant filter unit which is fluidically interposed between said liquid pump and said engine heater core and through which said liquid coolant flows as said liquid coolant flows from said liquid pump to said engine heater core, said coolant filter unit including
      (1) an outer case having
         (a) an inlet end,
         (b) an outlet end,
         (c) a tubular wall extending between the inlet end and the outlet end,
         (d) an outer surface on the tubular wall,
         (e) an inner surface on the tubular wall,
         (f) an internal bore defined by the inner surface of the tubular wall, the internal bore extending between the inlet end of the outer case and the outlet end of the outer case,
         (g) an external screw thread on the outer surface of the outer case adjacent to the inlet end,
         (h) an outlet hose connection on the outlet end of the outer case, the outlet hose connection being fluidically connected to the internal bore, and
         (i) a hose engaging element on the outlet hose connection, and
      (2) an inner core unit which is releasably connected to the outer case when said coolant filter unit is in a use condition, the inner core unit including
         (a) an inlet end which is connected to the inlet end of the outer case when said filter unit is in the use condition,
         (b) a second end which is located adjacent to the outlet end of the outer case when said filter unit is in the use condition,
         (c) a cap on the inlet end of the inner core unit, the cap including a screw thread located to threadably engage the external screw thread on the outer surface of the outer case when the inner core is in the use condition, (d) a tubular wall mounted on the cap and being located in the internal bore of the outer case when said filter unit is in the use condition, the tubular wall having
  (i) a first end fixed to the cap,
  (ii) a second end which is located in the internal bore of the outer case when said filter unit is in the use condition,
  (iii) a perforated tubular wall which is formed of stainless steel, the perorated wall being sized and configured to be accommodated in the internal bore defined by the inner surface of the outer case when said filter unit is in the use condition, the perforated wall having an outer surface which is in fluid communication with the internal bore of the outer case when said filter unit is in the use condition, an internal surface and an internal bore defined by the inner surface of the tubular wall and which extends between the first end of the tubular wall and the second end of the tubular wall, the tubular wall further having a multiplicity of fluid passage holes defined therethrough which fluidically connect the internal bore of the tubular wall to the outer surface of the tubular wall whereby the internal bore of the tubular wall is in fluid communication with the internal bore of the outer case when said filter unit is in the use condition, the internal bore of the tubular wall being fluidically connected to the inlet end of the inner core whereby the inlet end of the outer case is fluidically connected to the outlet end of the outer case via said filter unit,
  (e) an inlet hose connection on the cap and which is fluidically connected to the internal bore of the tubular wall,
  (f) a hose engaging element on the inlet hose connection, and
  (g) a positioning tab system on the inner core and on the outer case;
E) an inlet hose having an inlet end fluidically connected to said liquid pump and an outlet end fluidically connected to the inlet hose connection of the inner core; and
F) an outlet hose having an inlet end fluidically connected to the outlet hose connection on the outlet end of the outer case and an outlet end fluidically connected to said engine heater core.

2. The system defined in claim 1 further including an inlet ball valve in the inlet hose connection of the inner core.

3. The system defined in claim 2 further including an outlet ball valve in the outlet hose connection of the outer case.

4. The system defined in claim 1 further including a viewing window defined through the outer case.

5. The system defined in claim 2 wherein the inlet ball valve includes a set screw.

6. The system defined in claim 3 wherein the outlet ball valve includes a set screw.

7. A system for filtering coolant used in an engine of an automobile comprising:
  A) an engine liquid coolant;
  B) a liquid pump fluidically connected to said liquid coolant for moving said liquid coolant through an automobile engine to cool that automobile engine;
  C) an engine heater core which is cooled by said liquid coolant;
  D) a coolant filter unit which is fluidically interposed between said liquid pump and said engine heater core and through which said liquid coolant flows as said liquid coolant flows from said liquid pump to said engine heater core, said coolant filter unit including
    (1) an outer ease, the outer case including a fluid outlet and a viewing window defined through the outer case,
    (2) an inner core accommodated in the outer case, the inner core including a fluid inlet, the inner core including a perforated tubular wall with the fluid inlet being fluidically connected to the fluid outlet via the inner core and via the perforated tubular wall,
    (3) a releasable connection between the outer case and the inner core, and
    (4) positioning elements on the inner core;
  E) a fluid connection between said liquid pump and the fluid inlet of the inner core; and
  F) a fluid connection between the fluid outlet of the outer case and said engine heater core.

8. The system defined in claim 7 wherein the fluid inlet includes a set screw and the fluid outlet includes a set screw.

9. The system defined in claim 7 further including an inlet ball valve in the inlet hose connection of the inner core.

10. The system defined in claim 9 further including an outlet ball valve in the outlet hose connection of the outer case.

\* \* \* \* \*